United States Patent
Dang et al.

(10) Patent No.: US 11,062,538 B2
(45) Date of Patent: Jul. 13, 2021

(54) STEERING RACK CORROSION DETECTION USING STEERING DATA

(71) Applicant: Robert Bosch GmbH, Stuttgart, DE (US)

(72) Inventors: Li Dang, Novi, MI (US); Achim Frankovics, Novi, MI (US)

(73) Assignees: Robert Bosch Automotive Steering LLC, Florence, KY (US); Robert Bosch GmbH, Stuttgart (DE)

( * ) Notice: Subject to any disclaimer, the term of this patent is extended or adjusted under 35 U.S.C. 154(b) by 237 days.

(21) Appl. No.: 16/426,561

(22) Filed: May 30, 2019

(65) Prior Publication Data
US 2019/0371086 A1 Dec. 5, 2019

Related U.S. Application Data

(60) Provisional application No. 62/680,957, filed on Jun. 5, 2018.

(51) Int. Cl.
*G07C 5/08* (2006.01)
*G01N 17/04* (2006.01)

(52) U.S. Cl.
CPC .......... *G07C 5/085* (2013.01); *G01N 17/04* (2013.01); *G07C 5/0816* (2013.01)

(58) Field of Classification Search
CPC .... G07C 5/085; G07C 5/0816; G07C 5/0841; G01N 17/04; G01N 17/006; G01D 21/02; G01M 17/007; B62D 3/12
See application file for complete search history.

(56) References Cited

U.S. PATENT DOCUMENTS

| | | | |
|---|---|---|---|
| 6,598,699 B2 | 7/2003 | Takehara et al. | |
| 6,959,603 B2 | 11/2005 | Knight et al. | |
| 7,663,502 B2 | 2/2010 | Breed | |
| 7,887,077 B2 | 2/2011 | Thiers | |
| 8,370,019 B2 | 2/2013 | Bian et al. | |
| 9,821,800 B2 | 11/2017 | Yamakado et al. | |
| 2012/0103097 A1 | 5/2012 | Jauregui | |
| 2017/0248505 A1 | 8/2017 | Holmes et al. | |
| 2017/0274929 A1 * | 9/2017 | Sasaki | G01M 3/18 |

FOREIGN PATENT DOCUMENTS

| | | | |
|---|---|---|---|
| DE | 102014206468 | | 4/2014 |
| DE | 102016123900 A1 * | | 6/2018 |
| JP | 2016064710 A * | 4/2016 | G01M 3/18 |

* cited by examiner

*Primary Examiner* — Rodney A Butler
(74) *Attorney, Agent, or Firm* — David Kovacek; Maginot, Moore & Beck LLP

(57) ABSTRACT

A system and method for detecting corrosion in a steering rack of a vehicle based upon the performance of the steering rack in comparison to reference data collected for a non-corroded steering rack. Corrosion may be detected based upon analysis of performance data with respect to steering joggle or a data transform. Performance data may comprise displacement of the steering rack with respect to a neutral position, or the force applied to the components of the steering system.

20 Claims, 9 Drawing Sheets

STEERING RACK CORROSION DETECTION USING STEERING DATA

TECHNICAL FIELD

This disclosure relates to the field of vehicle diagnostics, and in particular diagnostics pertaining to vehicle steering systems.

BACKGROUND

Motor vehicles may use steering mechanisms comprising a rack-and-pinion system to control the rotational direction of wheels of the vehicle. Under normal operating conditions, a vehicle's steering rack may be exposed to water, dirt, debris, salt, or other roadway conditions known to be related to corrosion. Steering rack corrosion may contribute to sub-optimal performance of the steering mechanism, including requiring a greater amount of force to position the wheels during motion. Steering racks that have experienced sufficient corrosion may require maintenance, repair, or replacement for continued optimal operation of the vehicle.

Steering racks may corrode at different rates depending upon a number of factors, including localized exposure to corrosive conditions. Additionally, certain portions of the steering rack may corrode at a slower rate because of more-consistent interaction with the pinion gear. Vehicles having autonomous or semi-autonomous functions may also advantageously benefit from a self-diagnostic function to determine the level of corrosion of the steering rack.

SUMMARY

One aspect of this disclosure is directed to a corrosion detection system operable to detect corrosion of a steering rack of a vehicle, the system comprising a number of sensors, a processor, and a datastore. The system may also comprise a corrosion-level indicator operable to provide indication of the corrosion condition of the steering rack. The number of sensors may include a displacement sensor and force sensor operable to measure the status of the steering rack. The datastore may comprise instructions that when executed by the processor cause the processor to perform steps of acquiring data from the sensors, calculating additional data based upon the acquired data, calculating a probability of corrosion based upon the data, and activating the corrosion-level indicator based upon the calculated probability of corrosion.

Another aspect of this disclosure is directed to a method of detection of corrosion in a steering rack of a vehicle, the method comprising the steps of acquiring data, calculating additional data based upon the acquired data, calculating a probability of corrosion based upon the data, and indicating a level of corrosion based upon the calculated probability of corrosion. The probability of corrosion calculation may be based upon joggle characteristics in displacement of or force applied to the steering rack. The probability of corrosion calculation may be based upon comparisons of data subjected to a bandwidth limitation or a transform, such as a fast Fourier transform (FFT).

A further aspect of this disclosure is directed to a non-transitory computer-readable medium comprising instructions that when executed by a processor cause the processor to acquire data from external sensors, calculating additional data based upon the acquired data, calculating a probability of corrosion, and activating a corrosion indicator in a manner corresponding to the calculated probability of corrosion.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
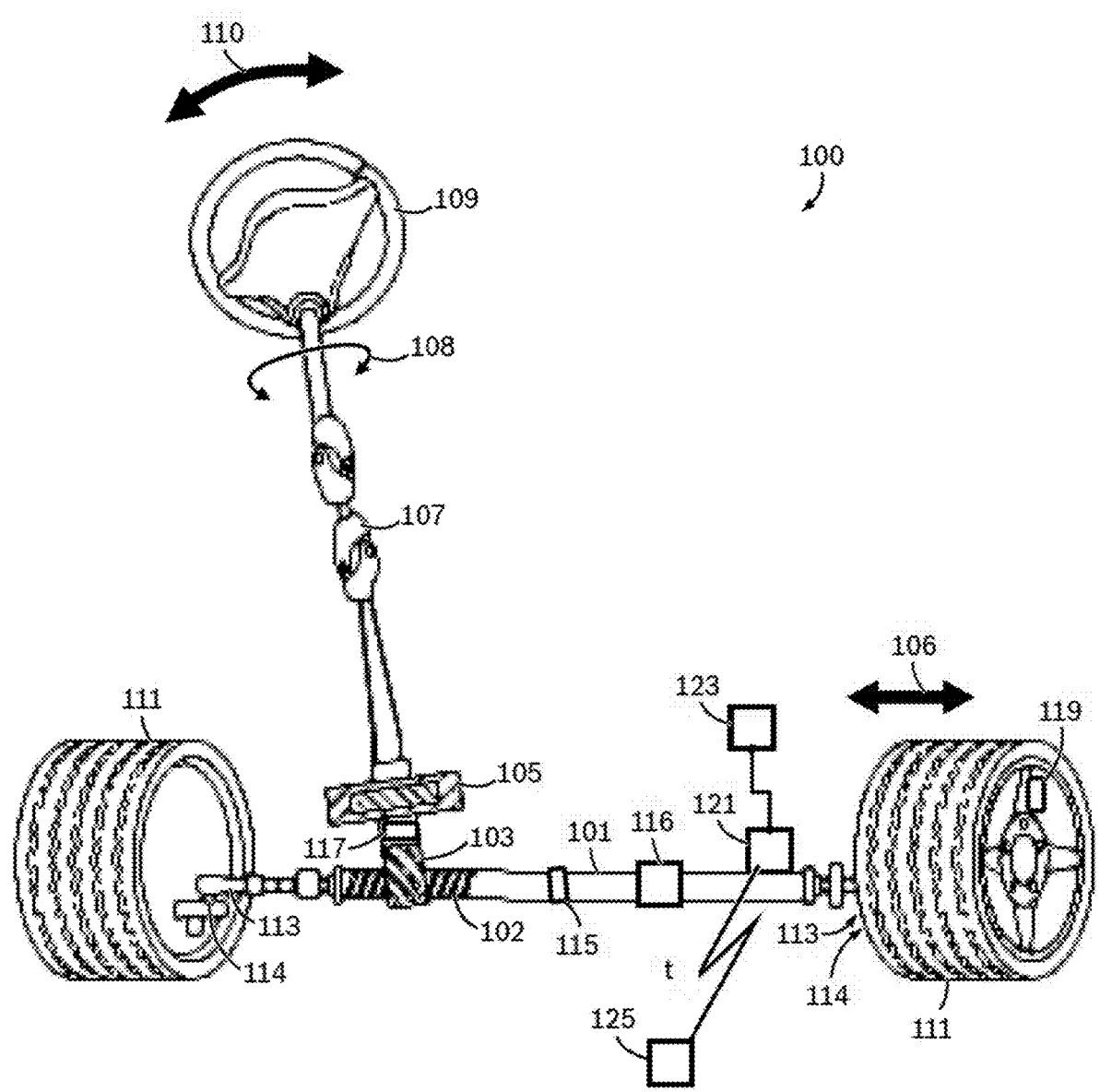
FIG. 1 shows a corrosion detection system operable to detect corrosion of a steering rack.

FIG. 1 illustrates a diagrammatic view of the components of a corrosion detection system 100. Corrosion detection system 100 monitors the condition of a steering rack 101 having a rack gear 102 operable to interface with a pinion gear 103. Pinion gear 103 is coupled to a torsion bar 105 and operable to create motion within steering rack 101 in a rack-motion direction 106 in response to movement of a steering column 107 in a turning direction 108 oriented in a torsional direction along the length of steering column 107. The torsional forces causing the motion of steering column 107 along turning direction 108 are in response to torsional force applied to a steering wheel 109 in a rotational direction 110 by a driver of the vehicle. This interaction permits a driver to use steering wheel 109 to steer the direction of wheels 111 of the vehicle. Each of wheels 111 be coupled to steering rack 101 via a tie rod 113 and a swivel pin 114.

Steering rack 101 may be exposed to corrosive elements and environments during normal operation of the associated vehicle. When portions of steering rack 101 become corroded, the associated force necessary for rack gear 102 to displace steering rack 101 along rack-motion direction 106 increases compared to a non-corroded condition. Extensive corrosion of steering rack 101 may cause sub-optimal performance or possible failure to operate within specified parameters. It is therefore desirable to monitor the corrosion conditions of steering rack 101 in order to optimize vehicle operation.

In the depicted embodiment, a pair of wheels 111 are coupled to a single steering rack 101, but other embodiments may have other arrangements without deviating from the teachings disclosed herein. In the depicted embodiment, rack gear 102 comprises a portion of steering rack 101, but other embodiments may have different configurations of rack gear 102 without deviating from the teachings disclosed herein.

Corrosion detection system 100 comprises a number of sensors operable to provide data useful in making a determination about the corrosion conditions of steering rack 101. A force sensor 115 is operable to measure the force applied to a steering component of the vehicle, such as the force of the torque along turning direction 108 on steering column 107. Although in the depicted embodiment the force of the torque is measured as applied to torsion bar 105, other embodiments may measure the force applied to displace the relative position of the pinion gear 103 with respect to steering rack 101 at steering wheel 109, steering column 107, or pinion gear 103 without deviating from the teachings disclosed therein. In some embodiments, force sensor 115 may be operable to measure a linear force applied to a steering component of the vehicle without deviating from the teachings disclosed herein. The force sensor 115 may advantageously also be associated with other systems of the vehicle without deviating from the teachings disclosed herein. In the depicted embodiment, force sensor 115 is disposed upon steering rack 101, but other embodiments may comprise other arrangements such as torsion bar 105, steering column 107, steering wheel 109, or any other location operable to monitor the applied force of the torsion bar 105 without deviating from the teachings disclosed herein. In some embodiments, force sensor 115 may comprise a motor-torque sensor, a torsion-bar torque sensor, a differential force sensor or any other alternative equivalent known to one of ordinary skill in the art without deviating from the teachings disclosed herein.

In some embodiments, corrosion detection system 100 may further comprise a power steering feature such as a steering motor 116. The steering motor 116 may be operable to apply additional force to steering rack 101 such that the position and motion of steering rack 101 optimally controlled. In the depicted embodiment, steering motor 116 may comprise an electric steering motor. In some embodiments, steering motor 116 may comprise a hydraulic steering motor, a pneumatic steering motor, a combination of the above configurations of a steering motor, or any other alternative equivalent known to one of ordinary skill in the art without deviating from the teachings herein.

Corrosion detection system 100 also comprises a displacement sensor 117 operable to measure the displacement of pinion gear 103 with respect to a neutral position of steering rack 101 within the range of rack gear 102. In the depicted embodiment, the displacement of pinion gear 103 may be measured by way of steering-angle displacement with respect to a neutral position, measured in degrees or another unit of rotational displacement. In some embodiments, the displacement of pinion gear 103 with respect to the neutral position may be measured by way of linear displacement of the steering rack from the neutral position, measured in millimeters or some other unit of linear displacement without deviating from the teachings disclosed herein. Greater displacements from the neutral position are expected to require greater force under normal operating conditions, and thus the displacement must be associated with the force measured by force sensor 115 in order to estimate the level of corrosion. Additionally, because different portions of steering rack 101 may corrode at different rates, the displacement measurements may advantageously reveal that only certain portions of steering rack 101 is suffering from corrosion. For example, because pinion gear 103 is more frequently subjected to smaller displacements than larger displacements, pinion gear 103 may have a "polishing" effect on rack gear 102, wherein the repeated interaction with portions of rack gear 102 prevents buildup of corrosion or corrosive elements near the neutral position. In contrast, because pinion gear 103 may not as frequently be displaced near the endpoints of rack gear 102, during normal operation greater corrosion and buildup of corrosive elements may be expected near the endpoints of rack gear 102. In the depicted embodiment, displacement sensor 117 is disposed in close proximity to pinion gear 103, but other embodiments may comprise other arrangements such as along steering rack 101, near rack gear 102, along steering column 107, within steering wheel 109, coupled to steering motor 116, at another point within the vehicle, or any other location operable to measure the displacement of pinion gear 103 with respect to rack gear 102 without deviating from the teachings disclosed herein. In some embodiments, displacement sensor 117 may advantageously also be associated with other systems of the vehicle without deviating from the teachings disclosed herein. The displacement of the steering rack 101 with respect to the neutral position, or the rotational displacement of steering column 107 or steering wheel 109, may be referred to as a "steering angle", describing the displacement of at least one component of the steering system of a vehicle with respect to a neutral position.

During normal operation, the moving velocity of the vehicle may also have an effect on the force required to successfully steer wheels 111. Moving velocity refers to the directional velocity of the vehicle during motion, and may describe velocity in a direction oriented in a longitudinal or latitudinal direction with respect to the body of the vehicle. By way of example and not limitation, if the vehicle is moving at very high speeds, more energy may be required to change the position of the wheels 111 during motion. In general, very high speeds may, require greater force to overcome lateral acceleration, and very low speeds may require greater force to overcome friction between a wheel 111 and the road surface. A velocity sensor 119 may be operable to measure the moving velocity of the vehicle. In the depicted embodiment, velocity sensor 119 is located within the structure of one of wheels 111, but other embodiments may comprise other arrangements such as along an axle, within proximity of an axle or wheel not associated with the corrosion-detection system, located elsewhere within the vehicle, located external to the vehicle, or in any other location operable to monitor the moving velocity of the vehicle without deviating from the teachings disclosed herein. In some embodiments, velocity sensor 119 may determine the moving velocity of the vehicle using global positioning system (GPS) tracking. In some embodiments, velocity sensor 119 may advantageously also be associated with other systems of the vehicle without deviating from the teachings disclosed herein.

Each of force sensor 115, displacement sensor 117, and velocity sensor 119 may be in data communication with a processor 121 operable to perform analytical functions with respect to the measured data provided by the sensors. In the depicted embodiment, processor 121 may comprise an electronic control unit (ECU) of the vehicle, but other embodiments may comprise a diagnostic dongle configured to interface with a diagnostic port of the vehicle, a portable processing device such as a smart phone or tablet computer, a cloud-based processing device, a network computer, a personal computer, a laptop computer, or any other equivalent device recognized by one of ordinary skill without deviating from the teachings disclosed herein. In the depicted embodiment, processor 121 is disposed in proximity to steering rack 101, but other embodiments may comprise other arrangements without deviating from the teachings disclosed herein.

Processor 121 may also be in data communication, with a datastore 123, which may comprise instructions for execution by processor 121. Datastore 123 may also act as a data depository for processor 121 or other processors associated with other systems of the vehicle. Datastore 123 may be embodied as a non-transitory computer-readable medium or a machine-readable storage medium for carrying or having computer-executable instructions or data structures stored thereon. Such non-transitory computer-readable media or machine-readable storage media may be any available media embodied in a hardware or physical form that can be accessed by a general purpose or special purpose processor. By way of example, and not limitation, such non-transitory computer-readable media or machine-readable storage media may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable media or machine-readable storage media. In the depicted embodiment, processor 121 is in wired communication with datastore 123, but other embodiments may comprise a wireless configuration without deviating from the teachings disclosed herein.

Processor 121 may also be in data communication with a corrosion-level indicator 125, operable to provide an indication to a user, technician, or driver of the estimated level of corrosion in steering rack 101. In the depicted embodiment, corrosion-level indicator 125 may comprise a warning light, a display within the vehicle, a display separate from the vehicle, an audible alarm, a haptic alarm, or any other indicator known to one of ordinary skill to be suitable to convey a condition of the vehicle to a user, technician, or driver without deviating from the teachings disclosed herein. In the depicted embodiment, processor 121 is in wireless communication with corrosion-level indicator 125, but other embodiments may comprise wired configurations without deviating from the teachings disclosed herein.

In some embodiments, corrosion detection system 100 may advantageously utilize existing sensors to acquire force data, displacement data, and velocity data describing the conditions of the vehicle.

Figure 2:
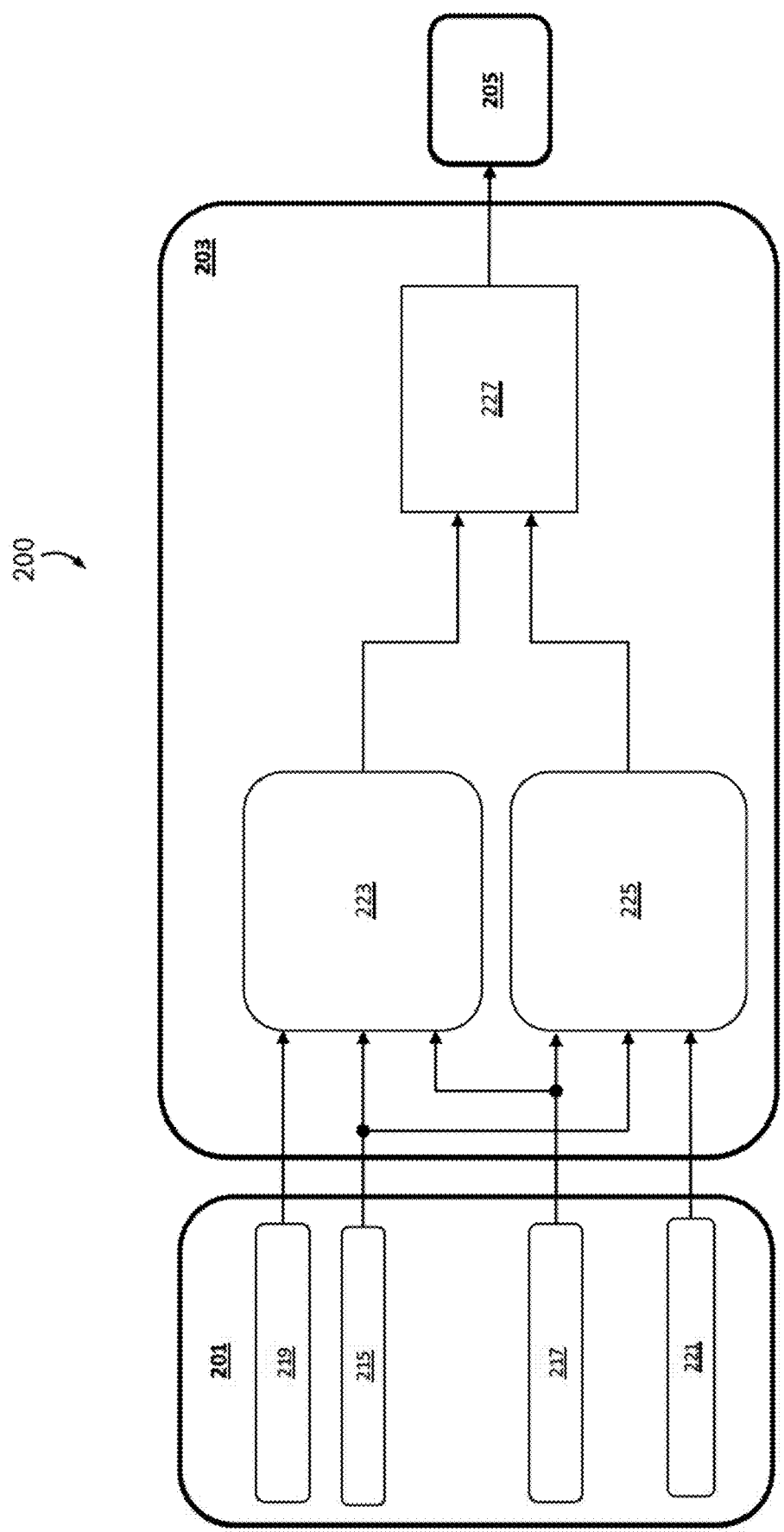
FIG. 2 is a diagrammatic illustration of the signal flow of a processor suitable for detecting corrosion in a steering rack.

FIG. 2 is a diagrammatic illustration of the signal flow of a processor 200 in a corrosion detection system operable to detect corrosion of a steering rack of a vehicle. Processor 200 may comprise a processor 121 (see FIG. 1), or in other embodiments other alternative arrangements without deviating from the teachings disclosed herein. Processor 200 comprises an input array 201, a processing cluster 203, and an output allay 205.

Input array 201 may be comprised of a force-data source 215, displacement-data source 217, velocity-data source 219 and a steering-change source 221. Force-data source 215 may provide a source of force data describing applied to steering components of the vehicle. Force-data source 215 may comprise a force sensor such as force sensor 115 (see FIG. 1), but other embodiments may comprise other configurations without deviating from the teachings disclosed herein. In the depicted embodiment, force-data source 215 may provide force data describing the torsional force applied to a torsion bar of the vehicle, but other embodiments may comprise data describing applied force to other components of the steering system of the vehicle without deviating from the teachings disclosed herein. In such other embodiments, processing cluster 203 may be configured to accommodate for the original source of force data.

Displacement-data source 217 may provide a source of displacement data describing the relative displacement of the steering rack 101 (see FIG. 1) with respect to a neutral position. In some embodiments, the displacement data may describe the rotational displacement of a steering column 107 or steering wheel 109 (see FIG. 1) with respect to a neutral position without deviating from the teachings disclosed herein. The displacement of steering rack 101 will be directly correlated to the linear or rotational displacement of other components of the steering system. Displacement-data source 217 may comprise a sensor placed in proximity of the steering rack, such as displacement sensor 117 (see FIG. 1), but other embodiments may comprise other configurations without deviating from the teachings disclosed herein. In the depicted embodiment, displacement-source data may provide displacement data describing the displacement of a steering rack from a neutral position. Some embodiments may comprise sources of data describing the displacement of a steering column, steering wheel, wheels, or other elements of a vehicle steering system without deviating from the teachings disclosed herein. In such other embodiments, processing cluster 203 may be configured to accommodate for the original source of the displacement data.

Velocity-data source 219 may provide a source of velocity data describing the moving velocity of the vehicle. Velocity-data source 219 may comprise a sensor such as velocity sensor 119 (see FIG. 1), but other embodiments may comprise other configurations without deviating from the teachings disclosed herein.

Steering-change source 221 may provide a source of steering-change data describing the changes to the displacement data with respect to time. In some embodiments, the steering-change data may describe the rate of change in the displacement of the steering rack 101, steering column 107, or steering wheel 109 without deviating from the teachings disclosed herein. In some embodiments, the steering-change data may describe the rate of change of a steering angle of the vehicle. In such embodiments, it would be expected that difference rates of change in the steering angle will result in a different expected behaviors for a non-corroded steering rack. In such embodiments, the steering-change data may describe the changes in displacement data with respect to the rate of change of the steering angle. In the depicted embodiment, the steering-change source 221 may comprise a processing module operable to track and analyze the changes in displacement data, but other embodiments may comprise other configurations without deviating from the teachings disclosed herein. In some embodiments, the steering-change source 221 may be an analysis module within processing cluster 203, or disposed external to processor system 200 without deviating from the teachings disclosed herein.

Input array 201 provides the data to processing cluster 203 for analysis. Processing cluster 203 may comprise a number of processing modules useful in performing analysis to determine a probability of corrosion of a steering rack. In the depicted embodiment, the processing modules may include a joggle module 223 and a bandlimit module 225. Other embodiments may have only one of joggle module 223 or bandlimit module 225 without deviating from the teachings disclosed herein. Other embodiments may comprise additional processing modules than those depicted without deviating from the teachings disclosed herein. The processing modules may comprise software, firmware, specialized circuits, programmable circuits, external processors in data communication with processing system 200, cloud-based processors in data communication with processing system 200, a combination of two or more of the above embodiments, or any other alternative equivalent implementation known to one of ordinary skill in the art without deviating from the teachings disclosed herein.

Each of the processing modules performs an analysis that contributes to an assignment of probability of corrosion at a condition check module 227. Condition check module performs a probability analysis in view of the results of the earlier processing modules, and in response provides a corresponding, output signal to output array 205. Output array 205 may comprise an indicator light, a display providing a status condition, an audible alert, or any other output capable of conveying to a user a status condition of the steering rack known to one of ordinary skill in the art without deviating from the teachings disclosed herein.

Figure 3:
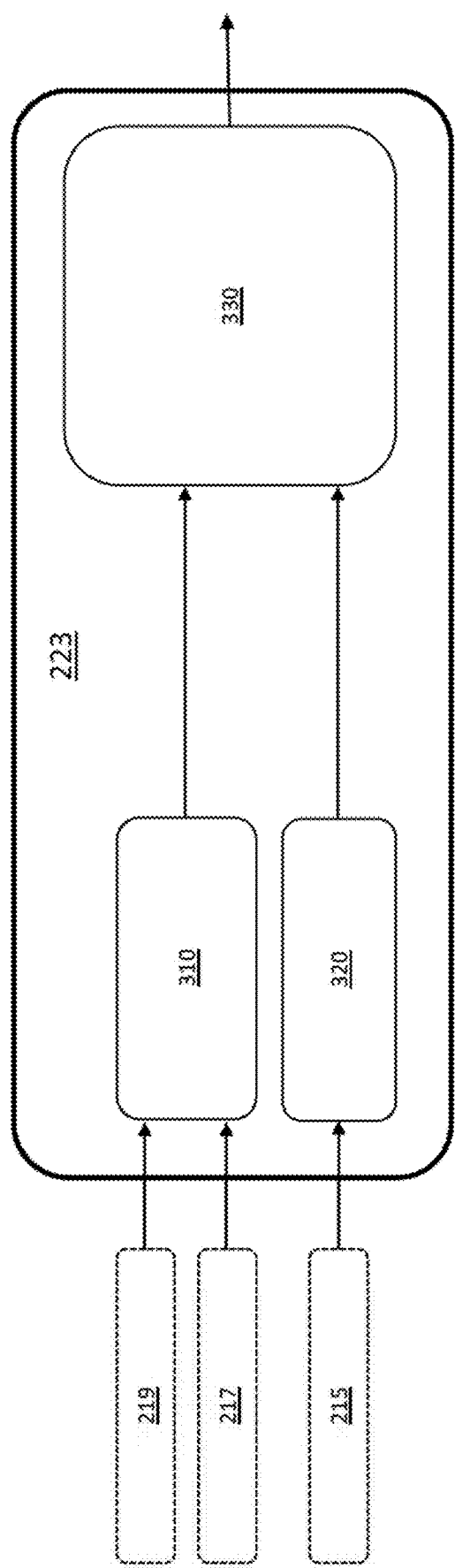
FIG. 3 is a diagrammatic illustration of the signal flow of a joggle detection module.

FIG. 3 provides a diagrammatic illustration of the signal flow of joggle module 223 (see FIG. 2). Joggle module 223 makes an assessment of probability of corrosion based upon the measured joggle of the steering system. As used herein, "joggle" refers to non-linear or irregular behaviors in the steering system components. Sources of joggle may include, but are not limited to, external forces caused by irregularities in the surface upon which the vehicle is driven (e.g., potholes, bumps, etc.), vibrations in the vehicle caused by friction forces from contact with the road, irregularities in a driver's steering of the vehicle, or other conditions related to the vehicle, driver or road surface. In a non-corroded steering rack, a certain degree of joggle is expected because of low friction between the steering rack and other components of the steering system. As corrosion increases in the steering rack, the friction forces are similarly expected to increase in manner corresponding to the location and severity of corrosion on the steering rack.

Joggle may be exhibited in the displacement of the steering rack. In the depicted embodiment, a displacement-joggle detection module 310 may be operable to analyze incoming displacement data from displacement-data source 217 and velocity-data source 219 (see FIG. 2) and calculate displacement-joggle data in response to the behavior described by the displacement data. In some embodiments, displacement-joggle detection module 310 may also receive data from additional inputs, such as steering-change source 221 (see FIG. 2). The displacement-joggle data may describe the joggle experienced in the displacement data, and may be used to determine a probability of corrosion in the steering rack. Under normal operating conditions, different displacement-joggle values are expected at different velocities, and thus the analysis is performed in view of the current moving velocity of the vehicle. In some embodiments, the displacement-joggle data may be compared to reference displacement-joggle data to determine an average change in displacement, a derivative of the displacement-joggle, an average derivative of the displacement-joggle, some combination of the above, or any other analysis directed to illustrating differences between the acquired data and the reference data. The reference data may comprise a data set, but other embodiments may comprise a single datum or other combinations of data illustrating displacement.

Joggle may be exhibited in the force applied to the steering rack. In the depicted embodiment, a force-joggle detection module 320 may be operable to analyze incoming force data from force-data source 215 and calculate a probability of corrosion in the steering rack in response to the behavior described by the force data.

In the depicted embodiment, the force applied to the steering rack may be measured at the torsion bar of the vehicle, but other embodiments may comprise measurements of a force or torque applied to a steering wheel, steering column, the steering rack, or other components of the steering system. Because the force applied to the steering system is correlated to the displacement of the steering rack, changes in force application can experience joggle irregularities for reasons very similar to those causing displacement joggle. A force-joggle detection module 320 may therefore be operable to analyze the force data provided by force-data source 215.

In some embodiments, the force data may be compared to reference force-joggle data to determine a force-joggle, a derivative of the expected force-joggle values, an average derivative of the expected force-joggle values, some combination of the above, or any other analysis directed to illustrating differences between the acquired data and the reference data. The reference data may comprise a data set, but other embodiments may comprise a single datum or other combinations of data illustrating displacement. In a non-corroded steering system, an expected force value may be expressed for different degrees of steering rack displacement. In a corroded steering system, the friction required to adjust the displacement may increase because of corrosion, and thus the measured force forces will increase accordingly to overcome the additional friction. Force-joggle detection module 320 may calculate the joggle of the force data based upon the total magnitude of force applied or based upon the change in force over time. For example, in some embodiments, a level of corrosion may be estimated based upon a magnitude of force-joggle expressed in the force data that is greater than one or more threshold values. In other embodiments, the level of corrosion may be estimated based upon changes in the force data being smaller than an expected value. Other embodiments may comprise other analytical factors to calculate the joggle of the force data without deviating from the teachings disclosed herein.

In the depicted embodiment, the results of displacement-joggle detection module 310 and force-joggle detection module 320 are provided to a corrosion-estimation module 330. Corrosion estimation module 330 may be operable to calculate a probability of corrosion of the steering rack based upon the received joggle data. In some embodiments, corrosion-estimation module 330 may be operable to maintain a probability value for corrosion of the steering rack, and update the probability based upon updates in the joggle data provided by displacement-joggle module 310 and force-joggle module 320. Corrosion-estimation module 330 may be operable to provide an output signal describing the probability of steering rack corrosion. In some embodiments, the output of corrosion-estimation module 330 may be a control signal for an indicator configured to provide a user with an indication of steering rack corrosion levels, such as corrosion-level indicator 125 (see FIG. 1). Some embodiments may comprise only one or displacement-joggle detection module 310 or force-joggle detection module 320 without deviating from the teachings disclosed herein. In some embodiments, the functions of corrosion-estimation module 330 may be performed by one or more of displacement-joggle detection module 310 or force-joggle detection module 320 without deviating from the teachings disclosed herein. Some embodiments may comprise other joggle-detection modules without deviating from the teachings disclosed herein.

Figure 4A:
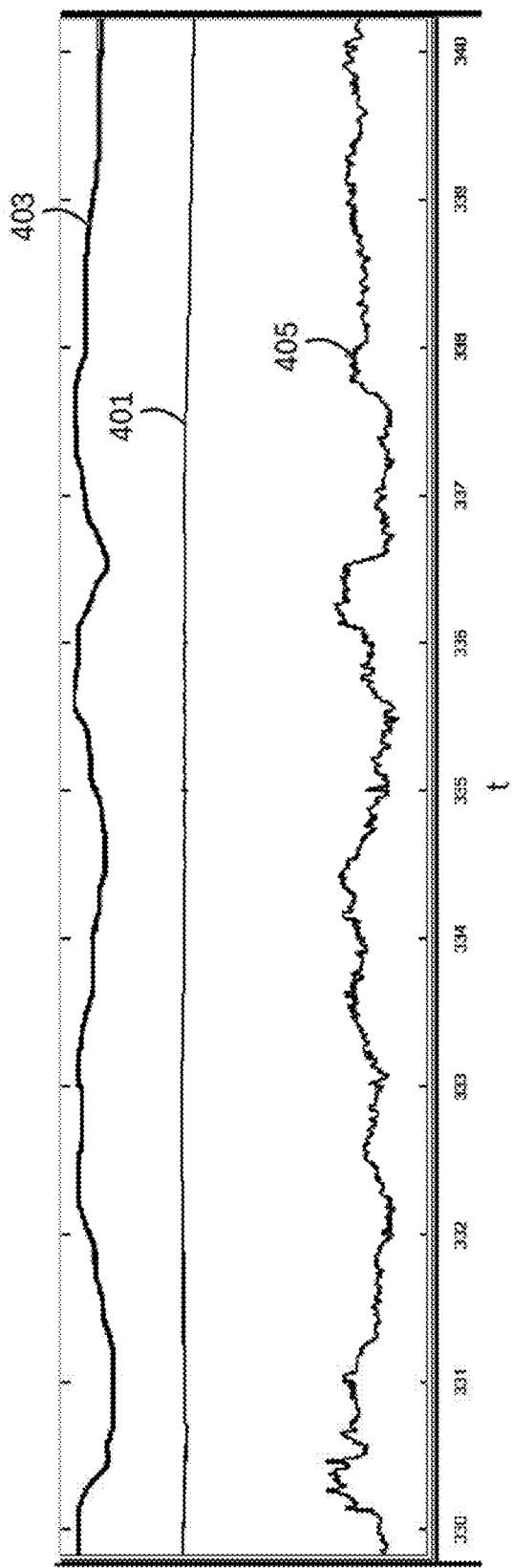
FIG. 4A is a visual illustration of a displacement-joggle comparison.

FIG. 4 depicts visual illustrations of joggle data that is useful for the joggle analysis of joggle module 223 (see FIG. 3). The data comprises curves representing the data required for joggle analysis over a time domain t. In the depicted embodiment, t may be measured in seconds of operation, but other embodiments may comprise other units without deviating from the teachings disclosed herein. The depicted data represented in FIG. 4A comprises a velocity curve 401 illustrating velocity data, a displacement curve 403 illustrating displacement data, and a force curve 405 illustrating force data. In the depicted embodiment, the data represented corresponds to data obtained from a non-corroded steering rack, and may be used as reference data for later measurements of data. Under normal operations, it is expected that a corroded steering rack will yield smoother curves having smaller or less frequent changes in the data for displacement curve 403 and force curve 405.

Figure 4B:
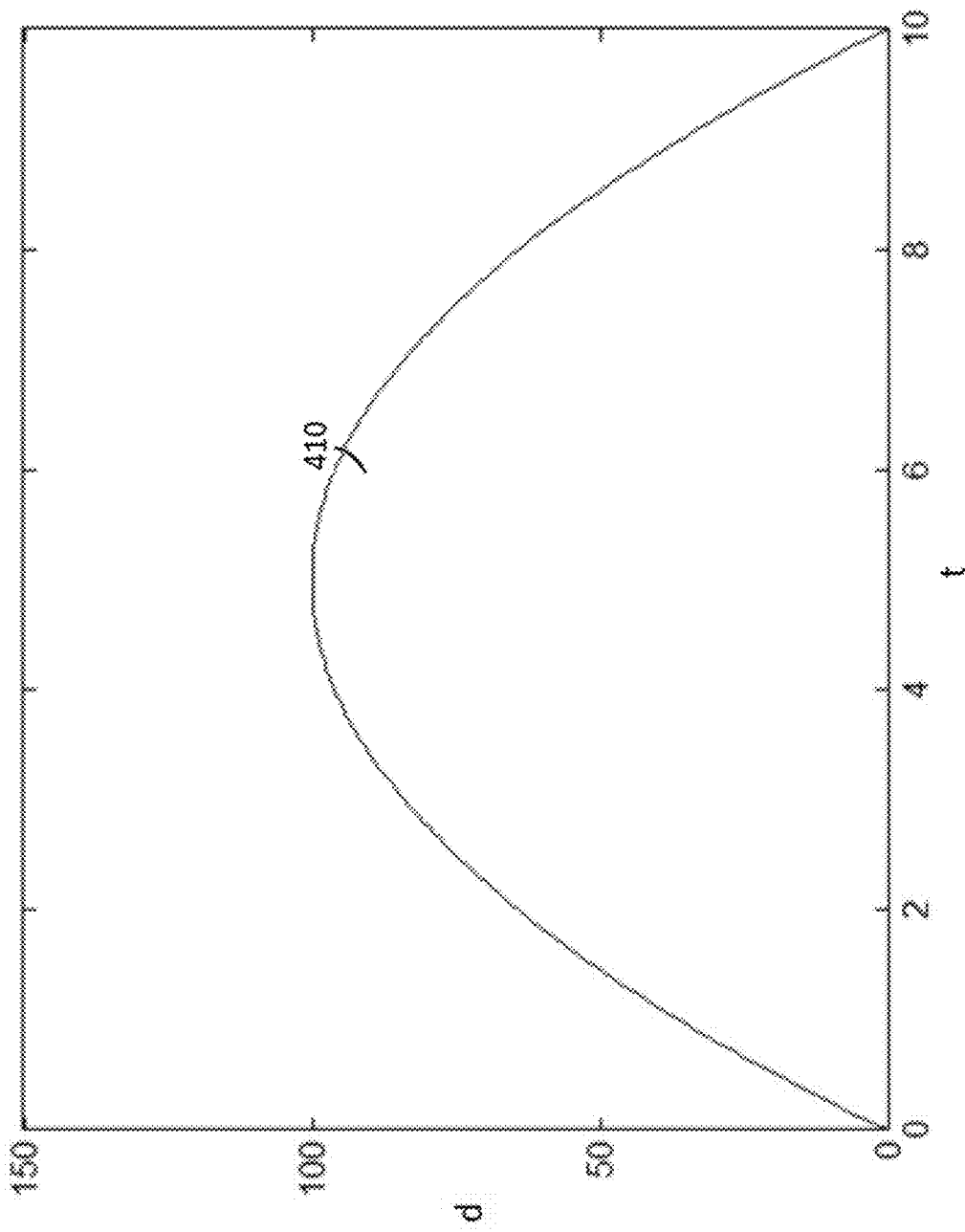
FIG. 4B is a visual illustration of a displacement-joggle comparison.

FIG. 4B depicts a data curve 410 that represents the behavior of a system having a non-corroded steering rack during a turn. In the depicted embodiment, data curve 410 may represent the displacement d of a steering rack of a vehicle with respect to a time t. In the depicted embodiment t is measured in seconds, but other embodiments may comprise any unit of time without deviating from the teachings disclosed herein. In the depicted embodiment, data curve 410 may be measured in millimeters, but other embodiments may comprise other units of displacement without deviating from the teachings disclosed herein. In some embodiments, a similar data curve may represent torque (N-m) applied to a steering component of a vehicle. In some embodiments, a similar curve may represent the force of a steering component of a vehicle without deviating from the teachings disclosed herein. In some embodiments, a similar curve may represent the steering-angle of a steering component of a vehicle without deviating from the teachings disclosed herein. In the depicted embodiment, the force represents the force applied to the steering rack during a turning operation of the vehicle, and thus data curve 410 begins with a neutral position, rises to a maximum value of the displacement applied during the sharpest point of the turn, and returns to the neutral position as the turn completes.

Figure 4C:
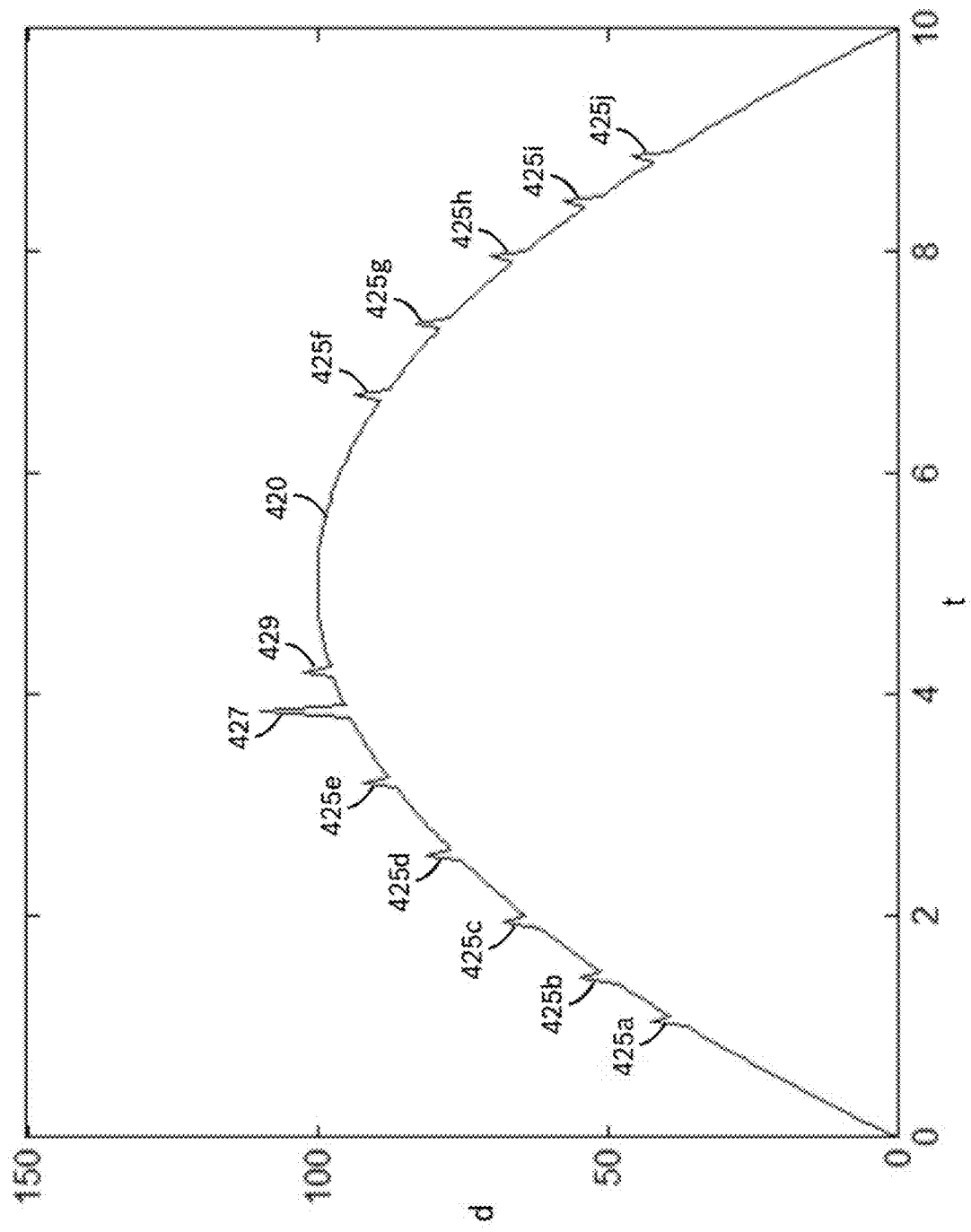
FIG. 4C is a visual illustration of a displacement-joggle comparison.

In contrast, FIG. 4C depicts a data curve 420 representing the displacement of a steering rack during a similar turning operation, except using a steering rack that may comprise a degree of corrosion. Data curve 420 is less smooth than data curve 410, comprised of a number of deviations 425 and 427. Each of deviations 425 corresponds to a small aberration from the expected curve. Though each of deviations 425 may not comprise an identical aberration, because deviations 425 are have a degree of regularity in terms of occurrence and magnitude, there is an increased probability that deviations 425 correspond to a degree of corrosion of the steering rack. In contrast, deviation 427 has a substantially different magnitude than any of deviations 425, and is the only deviation having such characteristics. As such, the probability of deviation 427 corresponding to corrosion of the steering rack may be lower, and the probability that deviation 427 corresponding to other factors is higher. More complex forms of analysis may be performed. For example, deviation 429 exists in a single point on the timeline, even though its respective displacement is achieved at multiple points on the timeline. In contrast, each of deviations 425 correspond to a displacement value that not only appears twice within the depicted timeline, but also experiences a deviation at each point that displacement is approach on data curve 420. In this manner, the consistency of the deviations at particular displacements may be utilized as a metric of the probability of corrosions. These comparisons may be utilized in a mathematical form by joggle analysis of the data, such as that performed by joggle module 223 (see FIG. 3).

Figure 5:
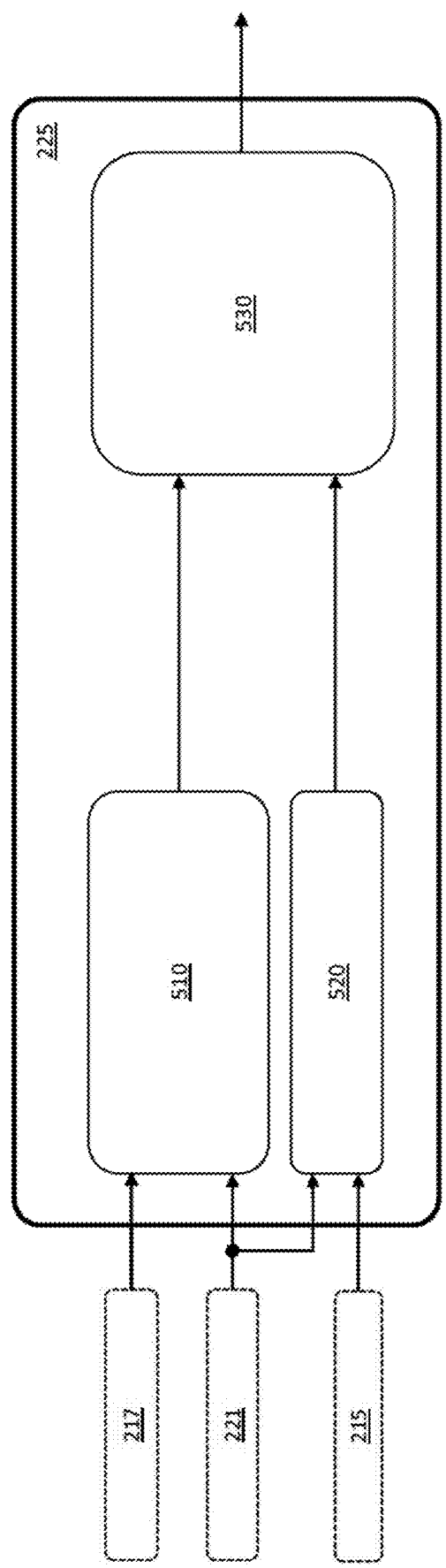
FIG. 5 is a diagrammatic illustration of the signal flow of a bandlimit analysis module.

Under normal operating conditions, a certain amount of joggle is expected in each of the displacement data and the force data for a non-corroded steering rack. The expected joggle may have a predictable form. In some embodiments, the expected joggle may be represented by a fast Fourier Transform (FFT) as a combination of signal components. FFT data indicating that the combination of signal components do not substantially comprise the expected signal components may be a sign of corrosion of the steering rack. Indications of corrosion may comprise one or more unexpected signal components, or one or more expected signal components having an unexpected magnitude. FIG. 5 depicts a diagrammatic illustration of the signal flow within a bandlimit module 225 (see FIG. 2). In the depicted embodiment, bandlimit module 225 may be operable to perform FFT analysis useful in estimating corrosion of a steering rack. In some embodiments, the expected joggle may be represented by a bandlimited time-domain signal.

Bandlimit module 225 may comprise a displacement-bandlimit module 510 that receives data from force-data source 215, displacement-data source 217, and steering-change source 221 (see FIG. 2). In some embodiments, displacement-bandlimit module 510 may receive data from steering-change source 221 (see FIG. 2) without deviating from the teachings disclosed herein. Displacement-bandlimit module 510 may perform a transform, such as a fast Fourier transform, upon the received displacement data that is correlated to the received velocity data. The resulting transform data may provide an arrangement of the displacement data with respect to components in a frequency domain. The resulting transformed displacement data may then be compared to an expected displacement transform, and the differences may be utilized to calculate a probability of corrosion in the steering rack. In some embodiments, the rate of change described by the steering-change data may be utilized to enhance the accuracy of the comparison, as different signal characteristics are expected in relation to different rates of change in the steering angle of a vehicle. By way of example and not limitation, the frequency of the expected steering-change signal may increase as the rate of change in the steering angle increases. Because the displacement of the steering rack is expected to change with the moving velocity of the vehicle under normal operating conditions, displacement-bandlimit module 510 may also utilize the velocity data. The expected displacement transform may comprise a combination of signal components within a band or bands of frequencies expected to correspond to the displacement of the steering rack when moving at a particular velocity. Signal components outside of the expected band or bands of frequencies, or signal components within the expected band or bands of frequencies having a magnitude significantly different than what is expected, may be considered in determining a probability of steering rack corrosion.

Bandlimit module 225 may comprise a force-bandlimit module 520 that receives data from force-data source 215. Force-bandlimit module 520 may perform a transform, such as a fast Fourier transform, upon the received force data. The resulting transform data may provide an arrangement of the force data with respect to components in a frequency domain. The resulting transformed force data may then be compared to an expected force transform, and the differences may be utilized to calculate the probability of corrosion in the steering rack. In some embodiments, the rate of change described by the force-data may be utilized to enhance the accuracy of the comparison, as different signal characteristics are expected in relation to different rates of change in the steering angle of a vehicle. By way of example and not limitation, the frequency of the expected force-data signal may increase as the rate of change in the steering angle increases. The expected force transform may comprise a combination of signal components within a band of frequencies expected to correspond to the joggle of the steering rack. Signal components outside of the expected band of frequencies, or signal components within the expected band of frequencies having a magnitude significantly different than what is expected, may be considered in determining a probability of steering rack corrosion.

In some embodiments, bandlimit module 225 may comprise a displacement-bandlimit module 510 and a force-bandlimit module 520 that utilize a time-domain bandlimiting operation rather than an FFT band-limiting operation. Such embodiments may advantageously reduce the computational complexity of the analysis performed by each displacement-bandlimit module 510 and torque-bandlimit module 520, which may further reduce costs of implementation and increase the speed of computation. In such embodiments, displacement-bandlimit module 510 may determine the presence of noise outside of the expected signal by comparing a reference signal to a filtered version of the displacement-data from displacement-data source 217 or steering-change data source 221. In such embodiments, the displacement-bandlimit module 510 applies a filter that removes expected displacement data or steering signal may comprise noise data that corresponds to the condition of the steering rack. The rate of change described by the steering-change data may additionally be utilized to enhance accuracy of the estimation. By way of example and not limitation, a faster rate of change in steering rack displacement may correspond to a higher frequency of steering-change data. Similarly, in such embodiments, force-bandlimit module 510 may determine the presence of noise outside of the expected signal by comparing a reference signal to a filtered version of the force-data from force-data source 215 or steering-change data from steering-change data source 221. In such embodiments, the force-bandlimit module 520 applies a filter that removes expected force data or steering-change data values from the received data to generate force-elements data or steering-elements data respectively. The remaining signal may comprise noise data that corresponds to the condition of the steering rack. The rate of change described by the steering-change data may additionally be utilized to enhance accuracy of the estimation. By way of example and not limitation, a faster rate of change in steering rack displacement may correspond to a higher frequency of force-data.

In embodiments utilizing time-domain analysis within bandlimit module 225, an initial analysis to determine the expected data corresponding to a non-corroded steering rack may be acquired using an FFT analysis prior to implementation of the system within the vehicle, such as in a laboratory setting.

Bandlimit module 225 may further comprise a corrosion-estimation module 530 operable to receive the transform comparison data from displacement-bandlimit module 510 and force-bandlimit module 520 and calculate a probability of steering rack corrosion based upon the received transform comparison data.

In some embodiments, corrosion-estimation module 530 may be operable to maintain a probability value for corrosion of the steering rack, and update the probability based upon updates in the transform comparison data provided by displacement-bandlimit module 510 and force-bandlimit module 520. Corrosion-estimation module 530 may be operable to provide an output signal describing the probability of steering rack corrosion. In some embodiments, the output of corrosion-estimation module 530 may be a control signal for an indicator configured to provide a user with an indication of steering rack corrosion levels, such as corrosion-level indicator 125 (see FIG. 1). Some embodiments may comprise only one or displacement-bandlimit module 510 or force-bandlimit module 520 without deviating from the teachings disclosed herein. In some embodiments, the functions of corrosion-estimation module 530 may be performed by one or more of displacement-bandlimit module 510 or force-bandlimit module 520 without deviating from the teachings disclosed herein. Some embodiments may comprise other joggle-detection modules without deviating from the teachings disclosed herein.

Figure 6A:
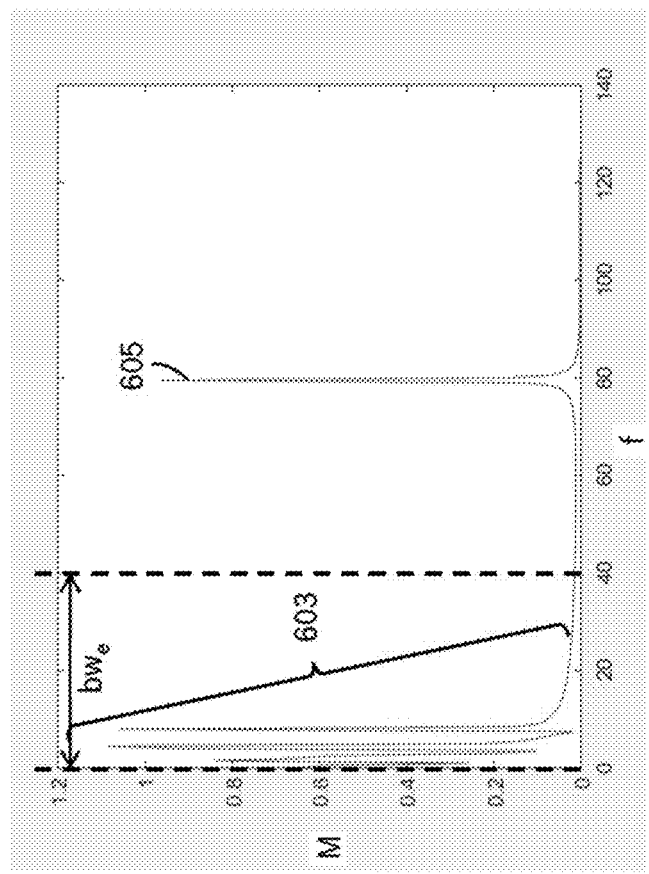
FIG. 6A is visual illustration of an FFT-joggle comparison.
Figure 6B:
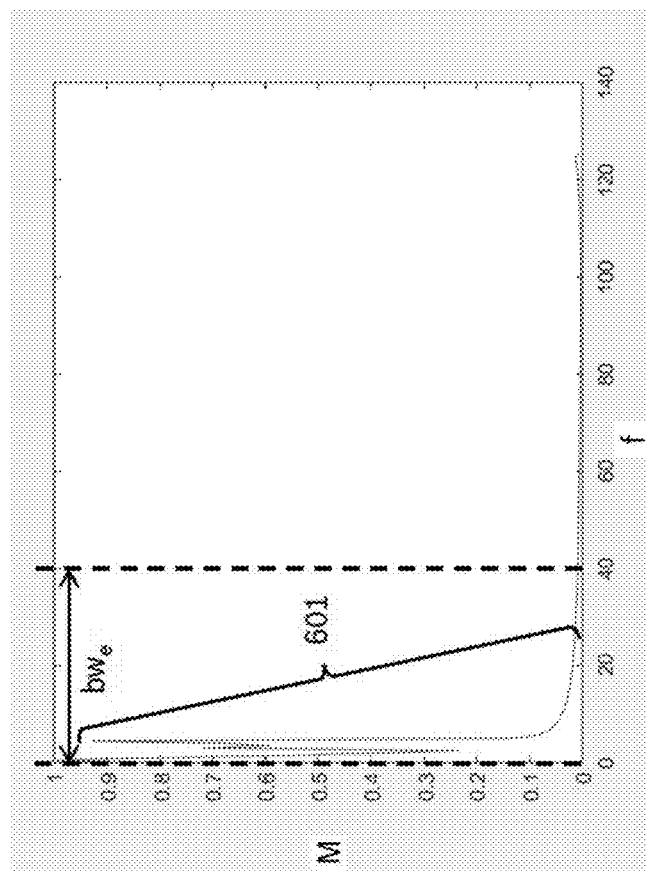
FIG. 6B is visual illustration of an FFT-joggle comparison.

FIG. 6 provides a visual illustration of a transform comparison that may be performed by displacement-bandlimit module 510. FIG. 6A represents a displacement transform of a non-corroded steering rack, representing a set of expected transform data. FIG. 6B represents a measured displacement transform corresponding to a steering rack that has experienced a degree of corrosion. Each of the transforms provide a magnitude M for signal components of a frequency f on the x-axis. An expected bandwidth, $bw_e$ may comprise a combination of signal components that are expected to be present in joggle data for a non-corroded steering rack. In FIG. 6A, signal component data 601 represents the expected signal components for a non-corroded steering rack. In FIG. 6B, signal component data 603 represent signal components that may not necessarily correspond to steering rack corrosion, as they fall within $bw_e$ and may comprise similar magnitude to expected signal component data 601. In FIG. 6B, signal component 605 falls outside of expected bandwidth $bw_e$, and thus is more likely to indicate steering rack corrosion. Some embodiments may utilize this bandwidth-oriented approach of comparison. Some embodiments may utilize transform data differences. By way of example and not limitation, an increased probability of corrosion may be assigned if the difference between the expected transform data and measured transform data is significant. Significant differences in the data may comprise signal components outside of the expected bandwidth $bw_e$, or substantial differences between the expected signal component data and the measured component data within $bw_e$, such as if particular components have a difference in magnitude that is above a threshold value. The expected signal component data may be dependent upon the velocity of the vehicle, or the specifications of the vehicle, such as mass or material composition.

Figure 7:
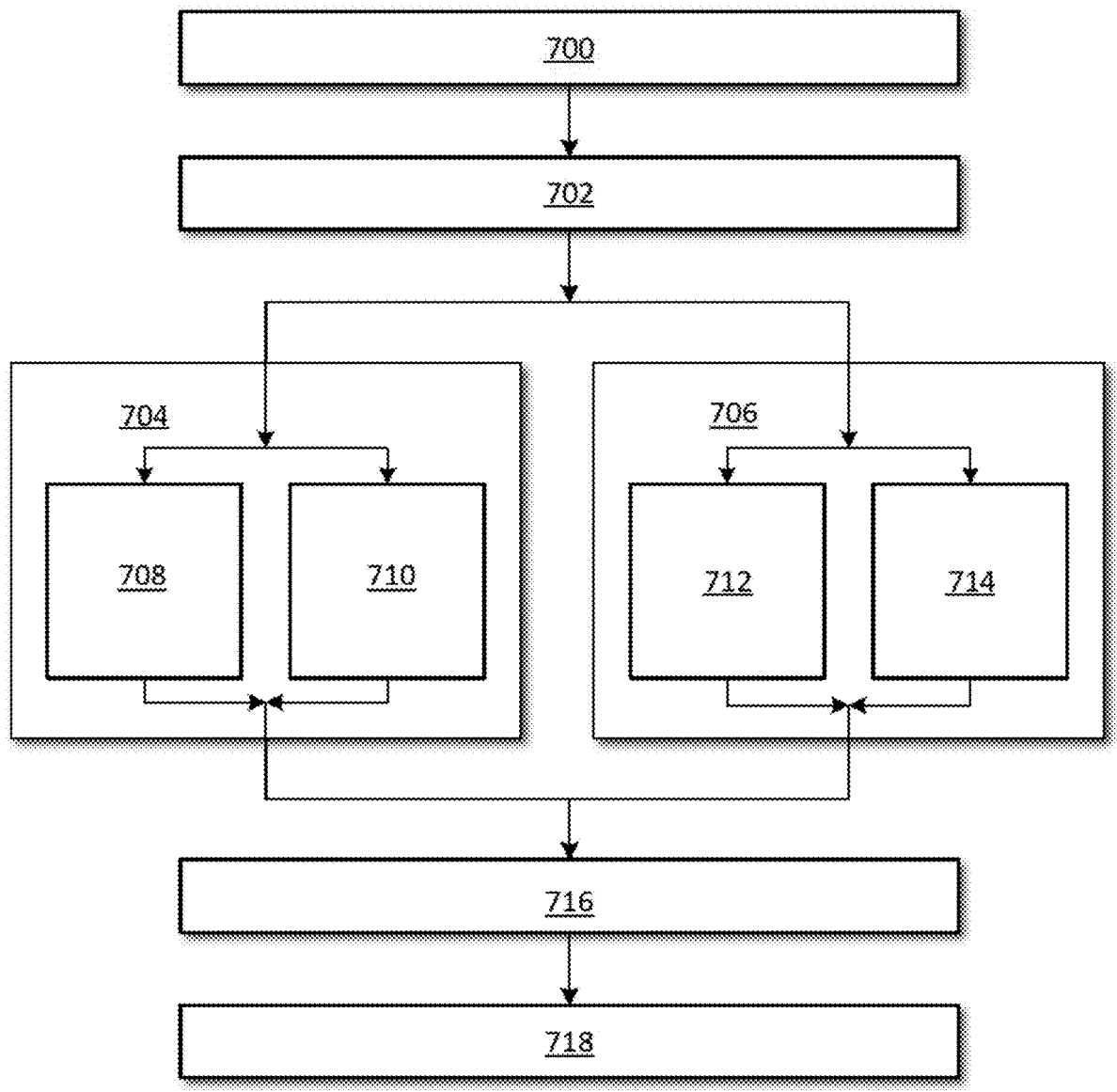
FIG. 7 is a flowchart describing a method of detecting corrosion in a steering rack.

FIG. 7 depicts a flowchart of a method for detecting corrosion of a steering rack of a vehicle according to one embodiment of the teachings herein. The method begins at step 700 with the acquisition of relevant data. In the depicted embodiment, the acquired data may include displacement data describing the position of the steering rack relative to a neutral steering position, velocity data describing the moving velocity of the vehicle, or force data describing the force applied to the steering controls of the vehicle. The force data may comprise measures of force applied to one or more of the steering rack, a torsion bar, a steering column, a steering wheel, or any other component of the steering system subjected to torsional forces. Other embodiments may comprise other data that recognized by one of ordinary skill in the art to be useful in this detection. In the depicted embodiment, the data may be, acquired directly from sensors disposed upon the vehicle, but other embodiments may comprise other data sources without deviating from the teachings disclosed herein.

Proceeding to step 702, the displacement data may be analyzed to calculate steering change data describing how the displacement data changes with respect to time. In some embodiments, the steering-change data may be acquired in step 700 as a part of the acquired data, and such embodiments step 702 may be omitted. In some embodiments, additional data may be calculated at step 702 that may be utilized for later analysis without deviating from the teachings disclosed herein.

After data has been acquired and calculated, the method may proceed to at least one of a joggle-analysis at step 704 or a FFT-analysis at step 706. Step 704 may be performed by a processing element, such as a joggle module 223 (see FIG. 2), but other embodiments may comprise other processing elements without deviating from the teachings disclosed herein. Step 704 comprises at least one of a displacement-joggle data analysis at sub-step 708 or a force-joggle analysis at sub-step 710. Some embodiments may comprise only one of sub-step 708 or sub-step 710 without deviating from the teachings disclosed herein. Sub-step 708 and sub-step 710 may be completed concurrently, or consecutively in any order without deviating from the teachings disclosed herein. In some embodiments, step 704 may include other sub-steps comprising analyses other than, or in addition to, one or more of sub-step 708 or sub-step 710.

Step 706 may be performed by a processing element, such as an bandlimit module 225 (see FIG. 2 but other embodiments may comprise other processing elements without deviating from the teachings disclosed herein. Step 706 comprises at least one of a displacement-FFT data analysis at sub-step 712 or a force-FFT analysis at sub-step 714. Some embodiments may comprise only one of sub-step 712 or sub-step 714 without deviating from the teachings disclosed herein. Sub-step 712 and sub-step 714 may be completed concurrently, or consecutively in any order without deviating from the teachings disclosed herein. In some embodiments, step 706 may include other sub-steps comprising analyses other than, or in addition to, one or more of sub-step 712 or sub-step 714.

Steps 704 and 706 may be performed concurrently, or consecutively in any order without deviating from the teachings disclosed herein. Some embodiments may comprise only one of step 704 or step 706 without deviating from the teachings disclosed herein. Some embodiments may comprise other analysis steps in addition to one or more of steps 704 or 706 without deviating from the teachings disclosed herein.

Upon completion of the selected analyses from one or more of steps 704 or 706, the method proceeds to step 716, where the results of the analysis are utilized to assign a probability of corrosion in the steering rack, based upon the results of the data analysis steps. In some embodiments, this probability may be stored in a memory for use in real-time analysis systems or other systems that benefit from storage of the data. In some such embodiments, the stored probability data may be utilized to assign the current probability, such as a rolling average or other weighted probability scheme.

Once the probability has been assigned, the method proceeds to step 718, where an indication of the corrosion in the steering rack is provided. The indication may take the form of a visual indicator, such as a warning light, displayed message, or other visual display provided to a user of the vehicle, or a technician. The indication may take the form of an audible or haptic signal provided to a user of the vehicle or a technician. In some embodiments, if little or no corrosion is probable, the indication may be a lack of visual, audible, or haptic response. In such systems, the indication of the level of corrosion may behave as a warning indication, rather than a general-purpose indication. In some embodiments, one or more indications may be accessible to a user of the vehicle or a technician, and the different indications may be accessed in different modes or mechanisms. For example, an indication of general corrosion level of the steering rack may be accessible within a visual display of a head unit within the vehicle, whereas when the method determines a high likelihood of corrosion, an alert may be displayed in the vehicle dashboard advising to a user that the vehicle be taken to a service station for maintenance. Other embodiments may comprise other combinations of indications of the level of steering rack corrosion without deviating from the teachings disclosed herein.

In some embodiments, completion of step 718 may end the method. In other embodiments, the method may be performed iteratively, returning to step 700 after completion of step 718. In such iterative embodiments, the method may advantageously provide a real-time monitor of steering rack corrosion. In some embodiments, the method may be performed in response to particular conditions, such as upon traveling a threshold number of miles, after a certain number of vehicle activations, after a predetermined length of time. The particular conditions may be determined based upon the specifications of the vehicle, and may vary between different vehicles without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A corrosion detection system operable to detect corrosion of a steering rack of a vehicle, the system comprising:
   a displacement sensor operable to generate displacement data describing the displacement of the steering rack with respect to a neutral position;
   a force sensor operable to generate force data describing the force applied to steering rack;
   a corrosion-level indicator operable to provide an indication of a corrosion condition of the steering rack;
   a processor in data communication with the displacement sensor and the force sensor; and a datastore comprising instructions operable by the processor that when executed cause the processor to perform the steps of
acquiring displacement data from the displacement sensor,
acquiring force data from the force sensor,
calculate steering-change data describing the change of displacement data with respect to time;
calculating a probability of corrosion on the steering rack in response to the values of the force data and the steering-change data; and
activating the corrosion-level indicator to indicate a high-corrosion status when the probability of corrosion is greater than a threshold magnitude.

2. @The corrosion detection system of claim 1, wherein the datastore further comprises instructions that when executed by the processor cause the processor to perform the steps of:
calculating force-elements data describing signal elements of the force data after being filtered using a bandlimit filter;
comparing the signal of the calculated force-elements data to an expected force-band defining expected signal characteristics of the force-elements data corresponding to a non-corroded steering rack; and
assigning a probability of corrosion when the differences between the calculated force-elements data and the expected force-elements data have a magnitude greater than a threshold value.

3. The corrosion detection system of claim @2, the force-elements data comprises force-transform data describing the Fourier transform of the force-data and the bandlimit filter is applied in the frequency domain.

4. The corrosion detection system of claim 1, wherein the datastore further comprises instructions that when executed by the processor cause the processor to perform the steps of
calculating steering-elements data describing the signal elements of the steering-change data after being filtered using a bandlimit filter;
comparing the signal of the calculated steering-elements data to an expected steering-band defining expected signal characteristics of the steering-elements data corresponding to a non-corroded steering rack; and
assigning a probability of corrosion when the differences between the calculated steering-elements data and the expected steering-change data have a magnitude greater than a threshold value.

5. The corrosion detection system of claim 4, wherein the datastore further comprises instructions that when executed by the processor cause the processor to perform the steps of
calculating force-elements data describing signal elements of the force data after being filtered using a bandlimit filter;
comparing the signal of the calculated force-elements data to an expected force-band defining expected signal characteristics of the force-elements data corresponding to a non-corroded steering rack; and
assigning a probability of corrosion when the differences between the calculated force-elements data and the expected force-elements data have a magnitude greater than a threshold value.

6. The corrosion detection system of claim 1, further comprising a velocity sensor in data communication with the processor and operable to generate velocity data describing the moving velocity of the vehicle.

wherein the datastore further comprises instructions that when executed by the processor cause the processor to perform the steps of:
acquiring velocity data describing, the active moving velocity of the vehicle from the velocity sensor;
calculating a difference between the calculated steering-change data and expected values of the steering-change data corresponding to a non-corroded steering rack during motion at the active moving velocity; and
assigning a probability of corrosion when the difference is greater than a threshold value.

7. The corrosion detection system of claim 1, further comprising a velocity sensor in data communication with the processor and operable to generate velocity data describing the moving velocity of the vehicle.
wherein the datastore further comprises instructions that when executed by the processor cause the processor to perform the steps of:
acquiring velocity data describing the active moving velocity of the vehicle from the velocity sensor;
calculating a difference between the acquired force data and expected values of the force data corresponding to a non-corroded steering rack during motion at the active moving velocity; and
assigning a probability of corrosion when the difference is greater than a threshold value.

8. The corrosion detection system of claim 1, wherein the datastore comprises further instructions that when executed by the processor cause the processor to perform the steps of:
acquiring velocity data from a velocity sensor describing the active moving velocity of the vehicle;
calculating at least one of
a first difference between the calculated steering-change data and expected values of the steering-change data corresponding to a non-corroded steering rack during motion at the active moving velocity, or
a second difference between the acquired force data and expected values of the force data corresponding to a non-corroded steering rack during motion at the active moving velocity;
calculating at least one of
force-elements data describing a filtered form of the force data subjected to a first bandlimit filter, or
steering-elements data describing a filtered form of the steering-change data subjected to a second bandlimit filter;
calculating at least one of
third difference data describing the difference between the force-elements data and expected force data corresponding to the behavior of a non-corroded steering rack, or
fourth difference data describing the difference between the steering-elements data and expected steering-change data corresponding to the behavior of a non-corroded steering rack; and
assigning a probability of corrosion based upon one of the first difference if the first difference is greater than a first threshold, the second difference if the second difference is greater than a second threshold, the third difference if the third difference data has characteristics greater than a third threshold, or the fourth difference data if the fourth difference data has characteristics greater than a fourth threshold.

9. The corrosion detection system of claim 1, wherein the datastore comprises further instructions that when executed by the processor cause the processor to perform the steps of:

acquiring velocity data from a velocity sensor describing the active moving velocity of the vehicle;

calculating a first difference between the calculated steering-change data and expected values of the steering-change data corresponding to a non-corroded steering rack during motion at the active moving velocity;

calculating a second difference between the acquired force data and expected values of the force data corresponding to a non-corroded steering rack during motion at the active moving velocity;

calculating force-elements data describing a filtered form of the force data subjected to a first bandlimit filter;

calculating steering-elements data describing a filtered form of the steering-change data subjected to a second bandlimit filter;

calculating third difference data describing the difference between the force-elements data and expected force data corresponding to the behavior of anon-corroded steering rack;

calculating fourth difference data describing the difference between the steering-elements data and expected steering-change data corresponding to the behavior of a non-corroded steering rack; and assigning a probability of corrosion based upon the first difference if the first difference is greater than a first threshold, the second difference if the second difference is greater than a second threshold, the third difference if the third difference data has characteristics greater than a third threshold, or the fourth difference data if the fourth difference data has characteristics greater than a fourth threshold.

10. A method of detecting corrosion in a steering rack of a vehicle comprising:

acquiring force data describing the force applied to a steering component of the vehicle;

acquiring displacement data describing a displacement of the steering rack with respect to a neutral position;

calculating steering-change data describing changes of displacement data with respect to time;

calculating a probability of corrosion of the steering rack based on the values of the force data and the steering-change data for the displacement of the steering rack described by the displacement data; and indicating a level of corrosion in the steering rack corresponding to the calculated probability of corrosion, wherein corrosion is indicated when the calculated probability is greater than a threshold value.

11. The method of claim 10, wherein the calculating a probability of corrosion further comprises:

acquiring velocity data describing the active moving velocity of the vehicle;

calculating a difference between the calculated steering-change data during motion at the active moving velocity and expected values of the steering-change data corresponding to a non-corroded steering rack during motion at the active moving velocity; and assigning a probability of corrosion based upon the calculated difference if the difference is greater than a threshold.

12. The method of claim 10, wherein the calculating the probability of corrosion further comprises:

acquiring velocity data describing the active moving velocity of the vehicle;

calculating a difference between the acquired force data during motion at the active moving velocity and expected values of the force data corresponding to a non-corroded steering rack during motion at the active moving velocity; and assigning a probability of corrosion based upon the calculated difference when the difference is greater than a threshold value.

13. The method of claim 12, wherein the calculating the probability of corrosion further comprises:

calculating a second difference between the calculated steering-change data during motion at the active moving velocity and expected values of the steering-change data corresponding to a non-corroded steering rack during motion at the active moving velocity: and adjusting the assigned probability of corrosion based upon the second difference when the second difference is greater than a second threshold value.

14. The method of claim 10, wherein the calculating the probability of corrosion further comprises:

calculating force-elements data describing signal elements of the force data after being filtered using a bandlimit filter;

comparing the calculated force-elements data to an expected force-band defining expected characteristics of the force-elements data corresponding to the behavior of a non-corroded steering rack; and assigning a probability of corrosion when the difference between the calculated force-elements data and the expected force-band comprises characteristics that have a magnitude greater than a threshold value.

15. The method of claim 10, wherein the calculating the probability of corrosion further comprises:

calculating steering-elements data describing signal elements of the steering-change data after being filtered using a first bandlimit filter;

comparing the calculated steering-elements data to an expected steering-band defining expected characteristics of the steering-elements data corresponding to the behavior of a non-corroded steering rack; and assigning a probability of corrosion when the difference between the calculated steering-elements data and the expected steering-band comprises characteristics that have a magnitude greater than a threshold value.

16. The corrosion detection system of claim 15, wherein the steering-elements data comprises steering-transform data describing the Fourier transform of the steering-change data and the bandlimit filter is applied in the frequency domain.

17. The method of claim 15, wherein the calculating the probability of corrosion further comprises:

calculating force-elements data describing signal elements of the force data after being filtered using a second bandlimit filter;

comparing the calculated force-elements data to an expected force-band defining expected characteristics of the force-elements data corresponding to the behavior of a non-corroded steering rack; and assigning a probability of corrosion when the difference between the calculated force-elements data and the expected force-band comprises characteristics that have a magnitude greater than a threshold value.

18. The method of claim 10, wherein the calculating the probability of corrosion further comprises:

acquiring velocity data describing the active moving velocity of the vehicle;

calculating at least one of a first difference between the calculated steering-change data and expected values of the steering-change data corresponding to a non-corroded steering rack during motion at the active moving velocity, or a second difference between the acquired force data and expected values of the force data corresponding to a non-corroded steering rack during motion at the active moving velocity;

calculating at least one of
force-elements data describing a filtered form of the force data subjected to a first band unit filter, or
steering-elements data describing a filtered form of the steering-change data subjected to a second bandlimit filter;

calculating at least one of
third difference data describing the difference between the force-elements data and expected force data corresponding to the behavior of a non-corroded steering rack, or
fourth difference data describing the difference between the steering-elements data and expected steering-change data corresponding to the behavior of a non-corroded steering rack; and assigning a probability of corrosion based upon one of the first difference if the first difference is greater than a first threshold, the second difference if the second difference is greater than a second threshold, the third difference if the third difference data has characteristics greater than a third threshold, or the fourth difference data if the fourth difference data has characteristics greater than a fourth threshold.

19. A non-transitory computer-readable medium comprising instructions that when executed by a processor cause the processor to perform a corrosion detection for a steering rack of a vehicle, the corrosion detection comprising the steps of:

acquiring force data form a force sensor describing the force applied to a torsion bar of the vehicle;

acquiring displacement data from a displacement sensor describing the displacement of the steering rack with respect to a neutral position;

calculating steering-change data describing the change of steering rack displacement data with respect to time;

calculating a probability of corrosion on the steering rack in response to the values of the force data and the steering-change data; and activating an indicator to indicate a level of corrosion in the steering rack corresponding to the calculated probability of corrosion, wherein corrosion is indicated when the calculated probability is greater than a threshold value.

20. The non-transitory computer-readable medium of claim 19, wherein the calculating step further comprises:

acquiring velocity data from a velocity sensor describing the active moving velocity of the vehicle;

calculating at least one of
a first difference between the acquired steering-change data and expected values of the steering-change data corresponding to a non-corroded steering rack during motion at the active moving velocity, or
a second difference between the acquired force data and expected values of the force data corresponding to a non-corroded steering rack during motion at the active moving velocity;

calculating at least one of
force-elements data describing a filtered form of the force data subjected to a first bandlimit filter, or
steering-elements data describing a filtered form of the steering-change data subjected to a second bandlimit filter;

calculating at least one of
third difference data describing the difference between the force-elements data and expected force data corresponding to the behavior of a non-corroded steering rack, or
fourth difference data describing the difference between the steering-elements data and expected steering-change data corresponding to the behavior of a non-corroded steering rack; and assigning a probability of corrosion based upon one of the first difference if the first difference is greater than a first threshold, the second difference if the second difference is greater than a second threshold, the third difference if the third difference data has characteristics greater than a third threshold, or the fourth difference data if the fourth difference data has characteristics greater than a fourth threshold.

* * * * *

UNITED STATES PATENT AND TRADEMARK OFFICE
CERTIFICATE OF CORRECTION

PATENT NO. : 11,062,538 B2  
APPLICATION NO. : 16/426561  
DATED : July 13, 2021  
INVENTOR(S) : Dang et al.

Page 1 of 1

It is certified that error appears in the above-identified patent and that said Letters Patent is hereby corrected as shown below:

In the Claims

Claim 2, Column 15, Line 16: "@The corrosion detection system" should read --The corrosion detection system--.

Claim 3, Column 15, Line 31: "claim @2" should read --claim 2--.

Claim 5, Column 15, Line 52: "to perform the steps of" should read --to perform the steps of:--.

Claim 6, Column 16, Line 4: "describing, the" should read --describing the--.

Claim 9, Column 17, Lines 19-20: "anon-corroded steering rack" should read --a non-corroded steering rack--.

Claim 18, Column 19, Line 10: "first band unit filter" should read --first bandlimit filter--.

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*